United States Patent Office 3,179,620
Patented Apr. 20, 1965

3,179,620
STABILIZATION OF POLYOLEFIN PLASTICS WITH SUBSTITUTED DIAMINO DIPHENYL ALKANES
Henryk A. Cyba, Chicago, Ill., assignor to Universal Oil Products Company, Des Plaines, Ill., a corporation of Delaware
No Drawing. Filed Jan. 12, 1961, Ser. No. 82,177
6 Claims. (Cl. 260—45.9)

This application relates to the stabilization of polyolefin plastics and more particularly to a novel method of retarding deterioration thereof due to oxidation.

The commercial utilization of polyolefin plastics is a comparatively recent development. Polyethylene plastics, for example, possess high dielectric strength, especially at high frequency, and resistance to water and, therefore, are of particular advantage for use as insulators or dielectrics in condensers and other similar electronic equipment, as well as for use as thermoplastic moldings, coating agents, etc. However, it has been found that the polyethylene is subject to attack by atmospheric oxygen, particularly at elevated temperature, either in use or during manufacture, and this impairs the desirable properties thereof including, for example, reduction in the desirable electric properties, gelation upon oxidation, etc. The present invention provides a novel method of retarding this deterioration.

Polypropylene plastics also undergo oxidative deterioration which impairs the desirable properties thereof. The novel features of the present invention are employed to retard such deterioration. Polybutylene plastics similarly undergo deterioration when exposed to oxygen and the present invention also is used to retard the deleterious effect of oxygen on the polybutylene. It is understood that the novel inhibitors of the present invention also are used to stabilize polymeric plastics of higher molecular weight olefins which undergo deterioration due to oxygen.

The polyolefin plastics are of higher molecular weight usually having a molecular weight of above about 1000 and extending into the hundreds of thousands range. The polyolefins may be of the high density, medium density or low density type. In some cases the polyolefin plastic may comprise a mixed polymer of ethylene and propylene, ethylene and butylene, propylene and butylene, ethylene, propylene and butylene, etc.

Oxidative deterioration of the polyolefin plastic is retarded by incorporating therein a small but antioxidizing concentration of a hydrocarbon substituted diaminodiphenyl alkane inhibitor.

In a specific embodiment oxidative deterioration of polyethylene is retarded by incorporating therein an antioxidizing concentration of 4,4'-di-(cyclohexylamino)-diphenyl propane.

As hereinbefore set forth, oxidative deterioration of polyolefin plastic is retarded by incorporating therein an antioxidizing concentration of a hydrocarbon substituted diaminodiphenyl alkane. In a preferred embodiment the alkane comprises methane. Illustrative inhibitors in this embodiment include 4,4'-di-(methylamino)-diphenyl methane, 4,4'-di-(ethylamino)-diphenyl methane, 4,4'-di-(propylamino)-diphenyl methane, 4,4'-di-(butylamino)-diphenyl methane, 4,4'-di-(amylamino)-diphenyl methane, 4,4'-di-(hexylamino)-diphenyl methane, etc. In general it is preferred that the alkyl substituents are of secondary configuration and, accordingly, preferred inhibitors include 4,4'-di-(isopropylamino)-diphenyl methane,
4,4'-di-(sec-butylamino)-diphenyl methane,
4,4'-di-(sec-amylamino)-diphenyl methane,
4,4'-di-(sec-hexylamino)-diphenyl methane,
4,4'-di-(sec-heptylamino)-diphenyl methane,
4,4'-di-(sec-octylamino)-diphenyl methane,
4,4'-di-(sec-nonylamino)-diphenyl methane,
4,4'-di-(sec-decylamino)-diphenyl methane,
4,4'-di-(sec-undecylamino)-diphenyl methane,
4,4'-di-(sec-dodecylamino)-diphenyl methane,
4,4'-di-(sec-tridecylamino)-diphenyl methane,
4,4'-di-(sec-tetradecylamino)-diphenyl methane,
4,4'-di-(sec-pentadecylamino)-diphenyl methane,
4,4'-di-(sec-hexadecylamino)-diphenyl methane,
4,4'-di-(sec-heptadecylamino)-diphenyl methane,
4,4'-di-(sec-octadecylamino)-diphenyl methane,
4,4'-di-(sec-nonadecylamino)-diphenyl methane,
4,4'-di-(sec-eicosylamino)-diphenyl methane, etc.

Each alkyl group may contain from 1 to 20 or more carbon atoms and, in a preferred embodiment, each alkyl group contains from 3 to 12 carbon atoms. In still another embodiment the hydrocarbon substituents are cycloalkyl groups and particularly cyclohexyl. In this embodiment a particularly preferred inhibitor is 4,4'-di-(cyclohexylamino)-diphenyl methane.

In another preferred embodiment the hydrocarbon substituted diaminodiphenyl alkane is a hydrocarbon substituted diaminodiphenyl propane. Illustrative inhibitors in this embodiment include 4,4'-di-(methylamino)-diphenyl propane, 4,4'-di-(ethylamino)-diphenyl propane, 4,4'-di-(propylamino)-diphenyl propane, 4,4'-di-(butylamino)-diphenyl propane, 4,4'-di-(amylamino)-diphenyl propane, 4,4'-di-(hexylamino)-diphenyl propane, etc. Here again it is preferred that the alkyl substituents are of secondary configuration. In this preferred embodiment illustrative compounds include 4,4'-di-(isopropylamino)-diphenyl propane,
4,4'-di-(sec-butylamino)-diphenyl propane,
4,4'-di-(sec-amylamino)-diphenyl propane,
4,4'-di-(sec-hexylamino)-diphenyl propane,
4,4'-di-(sec-heptylamino)-diphenyl propane,
4,4'-di-(sec-octylamino)-diphenyl propane,
4,4'-di-(sec-nonylamino)-diphenyl propane,
4,4'-di-(sec-decylamino)-diphenyl propane,
4,4'-di-(sec-undecylamino)-diphenyl propane,
4,4'-di-(sec-dodecylamino)-diphenyl propane,
4,4'-di-(sec-tridecylamino)-diphenyl propane,
4,4'-di-(sec-tetradecylamino)-diphenyl propane,
4,4'-di-(sec-pentadecylamino)-diphenyl propane,
4,4'-di-(sec-hexadecylamino)-diphenyl propane,
4,4'-di-(sec-heptadecylamino)-diphenyl propane,
4,4'-di-(sec-octadecylamino)-diphenyl propane,
4,4'-di-(sec-nonadecylamino)-diphenyl propane,
4,4'-di-(sec-eicosylamino)-diphenyl propane, etc.

As before, each alkyl group may contain from 1 to 20 or more carbon atoms and preferably from 3 to about 12 carbon atoms. In another embodiment the hydrocarbon substituents are cycloalkyl groups and particularly cyclohexyl. A particularly preferred inhibitor in this embodiment is 4,4'-di-(cyclohexylamino)-diphenyl propane.

In still another embodiment the hydrocarbon substituted diaminodiphenyl alkane may be selected from correspondingly substituted diaminodiphenyl ethane, butane, hexane, heptane, octane, nonane, decane, undecane, dodecane, etc. Accordingly, it will be noted that the alkane group may contain from 1 to 12 or more carbon atoms and in the compounds containing 3 or more carbon atoms the alkane group may be straight chain or branch chain. Here again, it is preferred that the alkyl groups attached to the nitrogen atoms are of secondary configuration and are selected from the alkyl substituents hereinbefore specifically set forth. In still another embodiment the hydrocarbon substituents may be different, as, in such compounds as 4 - isopropyl - 4' - cyclohexyl-diaminodiphenyl methane, 4-sec-butyl-4'-cyclohexyl-diaminodiphenyl methane, 4-isopropyl-4'-sec-butyl-diaminodiphenyl methane, 4-sec-butyl-4'-sec-hexyl-diaminodiphenyl methane, etc., 4-methyl-4'-cyclohexyl-diaminodiphenyl propane, 4-ethyl-4'-cyclohexyl-diaminodiphenyl propane, 4-isopropyl-4'-cyclohexyl-diaminodiphenyl propane, 4-sec-butyl-4'-cyclohexyl-diaminodiphenyl propane, 4-isopropyl-4'-sec-butyl-diaminodiphenyl propane, etc.

It is understood that the hydrocarbon substituted diaminodiphenyl alkanes may contain other substituents attached to one or both of the phenyl rings and these substituents may include groups containing oxygen, nitrogen, sulfur, etc. For example, effective inhibitors were prepared to contain methoxy groups attached to the phenyl ring in compounds such as 4,4'-di-(isopropylamino)-3,3'-dimethyoxydiphenyl methane, 4,4'-di-(sec-butylamino)-2,5'-tetramethoxydiphenyl methane, etc.

In some cases the hydrocarbon substituted diaminodiphenyl alkane may comprise 4,4,4'4'-tetraalkyldiaminodiphenyl alkanes or 4,4,4',4'-tetracyclohexylaminodiphenyl alkanes or 4,4'-dialkyl-4,4'-dicyclohexyldiaminodiphenyl alkanes, etc. The alkyl groups in this embodiment are selected from those specifically set forth hereinbefore. It is understood that the various inhibitors which may be prepared and used in accordance with the present invention are not necessarily equivalent. In fact, some of these inhibitors are non-discoloring and therefore are particularly useful in white or light colored plastics. Other inhibitors are discoloring and therefore must be used in colored plastics.

The inhibitor generally will be utilized in a concentration of from about 0.001% to about 3% by weight of the plastic, although in some cases higher or lower concentration may be employed. The exact concentration to be used will depend upon the particular polyolefin being stabilized and, in most cases, concentrations of from about 0.01% to about 2% by weight usually will be employed.

The inhibitor of the present invention is incorporated in the polyolefin plastic in any suitable manner and at any suitable stage of preparation. In a preferred method, the inhibitor is incorporated in the polyolefin during the manufacture thereof. However, in cases where the polyolefin has already been manufactured, the inhibitor may be incoporated therein by melting the plastic and adding the inhibitor to the hot melt with stirring, either in a Banbury mixer or extruder, or in any other suitable manner. In some cases, the polyolefin plastic may be soaked in a bath of the inhibitor but this last method is not generally satisfactory and only should be used as a last resort.

The inhibitor may be utilized as such or prepared as a solution in a suitable solvent including alcohols, and particularly isopropyl alcohol, isobutyl alcohol, etc., hydrocarbons and particularly benzene, toluene, xylenes, cumene, etc. However, the solvent must not be detrimental to the polyolefin plastic and, therefore, a preferred solvent comprises the same solvent used during the manufacture or working of the polyolefin. It is understood that the inhibitor also may be used along with other additives incorporated in polyolefinic plastics for various purposes. For example, in colored plastics carbon black is used in a concentration of below about 5% by weight and generally of from about 1 to about 3% by weight. Similarly, pigments, zinc oxide, titanium oxide, etc. may be incorporated in polyolefinic plastics, the oxides usually being employed in a concentration of from about 2 to about 10% by weight. The inhibitor also may be used with various light or ultraviolet light stabilizers including nickel-bis-dithiocarbonates, nickel-bis-dihydroxypolyalkylphenol sulfides, dilauryl-B-mercaptodipropionate, dihydroxytetraalkyl sulfides, dihydroxytetraalkyl methanes, etc. In some cases silicates, dyes and/or fillers are also incorporated into the polyolefin.

It is understood that the inhibitor of the present invention may also may be used along with other inhibitors which generally will be of the phenolic or amine type and may include phenyl-alpha-naphthylamine, phenyl-beta-naphthylamine, phenothiazine, dialkylated phenols, trialkylated phenols, diphenyl-p-phenylenediamine, salol (salicylic acid esters), various phosgene alkylated phenol reaction products as various alkoxyalkyldihydroxybenzophenones, polyalkyldihydroxybenzophenones, tetrahydroxybenzophenones, nickel or cobalt salts of various O-hydroxydiazobenzene, etc.

The following examples are introduced to illustrate further the novelty and utility of the present invention but not with the intention of unduly limiting the same.

EXAMPLE I

The polyethylene used in this example is of the Zeigler Type, high density, and marketed under the trade name of "Hi-Fax" by Hercules Powder Company. In the Milling Test, corresponding to A.S.T.M. D-1248-52T, polyethylene plastic pellets are milled on a conventional mill in the presence of air, and the inhibitor, when employed, is milled therein. Periodically samples of the polyethylene are withdrawn, pressed to 3-4 mil thickness, and the resulting sheets are subjected to infrared analyses. The rate of increase of the carbonyl band at 1715 cm.$^{-1}$ is determined. It is apparent that the higher intensity of the carbonyl band indicates higher carbonyl concentration, the carbonyl groups resulting from oxidation reactions. An intensity value of 40 is taken as the Induction Period because decomposition is appreciably increased beyond this value.

In this series of runs, the milling was effected at a temperature of 180 C. The results obtained with a sample of the polyethylene without inhibitor and the results obtained with samples of the polyethylene containing different inhibitors are reported in the following table:

*Table I*

| Run | Inhibitor | Time in Minutes | | | | | | | | |
|---|---|---|---|---|---|---|---|---|---|---|
| | | 10 | 30 | 50 | 70 | 90 | 110 | 130 | 150 | 170 |
| 1 | None | 15 | 57 | 107 | | | | | | |
| 2 | 0.5% of 4,4'-di-(sec-butylamino)-diphenyl methane. | 27 | 27 | 40 | 40 | 40 | 42 | 29 | 57 | 65 |
| 3 | 0.5% of 4,4'-di-(cyclohexyl-amino)-diphenyl methane. | 25 | 30 | 32 | 37 | 40 | 35 | 37 | 35 | 36 |

From the data in the above table it will be seen that the polyethylene without inhibitor reached the Induction Period in less than 30 minutes. On the other hand the samples of polyethylene containing the inhibitors of the present invention were considerably improved, with the 4,4'-di-(cyclohexylamino)-diphenyl methane being particularly outstanding.

EXAMPLE II

The polyethylene used in this example is of high density and marketed under the trade name of "Fortiflex A" by the Celanese Corporation of America. These evaluations were made in the same manner as reported in Example I except for the temperature of milling. The results of a sample of the polyethylene without inhibitor and of a sample of the polyethylene containing 0.5% by weight of 4,4'-di-(cyclohexylamino)-diphenyl methane are reported in the following table:

Table II

| Run No. | Inhibitor | Time in Minutes | | | | | | | | | |
|---|---|---|---|---|---|---|---|---|---|---|---|
| | | 10 | 30 | 50 | 70 | 90 | 110 | 130 | 150 | 170 | 190 |
| 4 | None | 10 0-10 | 10 0-10 | 20 0-10 | 80 0-10 | 120 0-10 | 0-10 | 0-10 | 0-10 | 0-10 | 0-10 |
| 5 | 0.5% of 4,4'-di-(cyclohexylamino)-diphenyl methane. | | | | | | | | | | |

Here again it will be noted that the inhibitor of the present invention was very effective in retarding oxidation of the polyethylene.

EXAMPLE III

The polyethylene used in this example is the same as described in Example II. The effect of the inhibitor was determined by spreading the inhibitor evenly over the surface of a five gram sheet of uninhibited polyethylene, covering the first sheet with another five gram uninhibited sheet, pressing the sheets together at a temperature of 140° C. and a pressure of 10,000 p.s.i. These sheets then were cut into strips of about 1/8" x 1/8" and are pressed again at a temperature of 140°-150° C. and a pressure of 15,000 p.s.i. The sheets then were placed in a bomb and exposed to 110 pounds of oxygen at 125° C. The sheets are examined periodically by infrared, and the rate of increase of the carbonyl band at 1715 cm.$^{-1}$ is determined.

When evaluated in the above manner, a sample of the polyethylene without inhibitor reached a carbonyl intensity value of 674 in 72 hours and the sample at that time had a very bad odor and was brittle.

An inhibitor used in this series of evaluations was 4,4'-di-(isopropylamino)-diphenyl methane. In all cases the inhibitor was incorporated in the polyethylene in a concentration of 0.068% by weight. In the sample of 3 mil thickness containing 0.068% by weight of 4,4'-di-(isopropylamino)-diphenyl methane, after 240 hours the carbonyl band intensity was only 10. The sample at that time had only a very mild odor and was not brittle. In the sample of 4 mil thickness containing 0.068% by weight of 4,4'-di-(isopropylamino)-diphenyl methane, after 240 hours, the sample also had a carbonyl band intensity of 10 and also was of mild odor and not brittle.

A similar series of evaluations were made in the same manner as reported in the previous paragraph except that the inhibitor in this series was 4,4'-di-(sec-butylamino)-diphenyl methane. Both samples of 3 mil and 4 mil thickness, each containing 0.068% by weight of this inhibitor, had a carbonyl band intensity of only 10 after 240 hours and here again the odor was very mild and the samples were not brittle.

From the above data, it is seen that the inhibitors of the present invention were very effective in retarding oxidative deterioration of the polyethylene.

EXAMPLE IV

The polyethylene used in this example is the same as described in Example II. In the samples containing inhibitor, the inhibitor was used in a concentration of 0.075% by weight of the polyethylene and was incorporated therein by milling. The different samples of polyethylene were evaluated in a method similar to that described by Hawkins, Hansen, Matreyek and Winslow in Rubber Chemistry and Technology, October–November 1959, pages 1164–1170, except that an electrically heated aluminum block rather than an oven was used to maintain the desired temperature. The oxygen absorption of the sample was determined manometrically rather than volumetrically. In this method samples of the polyethylene, weighing about 0.5 gram each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to individual monometers containing mercury and the differential pressure is periodically determined. The Induction Period is taken as the number of hours required to reach a pressure differential of 20 cm. Hg.

The following table reports the results of a number of evaluations made in the above manner. The table shows the results obtained with a blank or control sample (not containing an inhibitor) and the different samples each containing a different inhibitor in a concentration of 0.075% by weight. The results reported are the average of duplicate runs.

Table III

| Run No. | Inhibitor | Induction Period, Hours to ΔP of 20 cm. Hg | Color |
|---|---|---|---|
| 6 | None | 7.5 | White. |
| 7 | 4,4-di-(cyclohexylamino)-diphenyl propane. | 268 | White. |
| 8 | 4,4'-di-(isopropylamino)-diphenyl propane. | 158 | Light tan to white. |
| 9 | 4,4'-di-(sec-butylamino)-diphenyl propane. | 198 | |

From the data in the above table it will be seen that all of the inhibitors were very effective in extending the Induction Period of the samples of polyethylene. As hereinbefore set forth, when used with white or light colored polyethylene, it is important that the inhibitor does not cause discoloration. It will be noted that 4,4'-di-(cyclohexylamino)-diphenyl propane was extremely effective in stabilizing the polyethylene and also did not cause discoloration. Accordingly, for use in white or light colored polyethylene, 4,4'-di-(cyclohexylamino)-diphenyl propane is particularly outstanding.

EXAMPLE V

As hereinbefore set forth, the inhibitor of the present invention also may contain alkoxy groups attached to the phenyl rings. This is illustrated by the present example in which the inhibitors comprised 4,4'-diisopropylamino-3,3'-dimethoxydiphenyl methane and 4,4'-di-sec-butylamino-2,5,2'5'-tetramethoxydiphenyl methane. Each of these inhibitors was incorporated in a concentration of 0.075% by weight in other samples of the polyethylene described in Example IV and were evaluated in the same manner as described therein. The results of these evaluations are reported in the following table, which also repeats Run No. 6 of Example IV which, it will be noted, is the blank or control run.

Table IV

| Run No. | Inhibitor | Induction Period Hours to ΔP of 20 cm. Hg. |
|---|---|---|
| 6 | None | 7.5 |
| 10 | 4,4'-diisopropylamino-3,3'-dimethoxydiphenyl methane. | 241 |
| 11 | 4,4'-di-sec-butylamino-2,5-2'5'-tetramethoxydiphenyl methane. | 259 |

From the data in the above table it will be seen that these inhibitors also were very effective in retarding oxidation of the polyethylene. However, the oxidized polyethylene was slightly discolored and therefore these inhibitors are used in polyolefin plastics other than white.

EXAMPLE VI

The polyolefin plastic of this example is polypropylene marketed under the trade name of "Moplen" by Montecatini. In general polypropylene is normally less stable than polyethylene and, therefore, the inhibitor is used in a larger concentration of 0.015% by weight of the polypropylene. The polypropylene samples are prepared and evaluated in the same manner as described in Example III.

0.015% by weight 4,4'-di-(cyclohexylamino)-diphenyl propane is incorporated in the polypropylene and serves to retard oxidation of the polypropylene.

In another evaluation, 0.015% by weight of 4,4'-di-(cyclohexylamino)-diphenyl methane is incorporated in another sample of the polypropylene and serves to retard oxidative deterioration thereof.

In still another evaluation 4,4'-di-(sec-butylamino)-diphenyl methane is incorporated in another sample of the polypropylene in a concentration of 0.015% by weight thereof. This serves to retard oxidative deterioration of the polypropylene.

EXAMPLE VII

The inhibitor of this example is 4,4'-di-(cyclohexylamino)-diphenyl propane and is utilized as an inhibitor in polybutylene. This inhibitor is incorporated in a concentration of 0.025% by weight by milling the inhibitor into polybutylene, and the polybutylene then is further processed in a conventional manner. The addition of the inhibitor serves to prolong the stability of the polybutylene during subsequent exposure to oxygen.

I claim as my invention:

1. A polyolefin selected from the group consisting of polyethylene, polypropylene, polybutylene and mixed polymers of at least two olefins from the group of ethylene, propylene and butylene, said polyolefin containing a stabilizing agent consisting essentially of an antioxidizing concentration of 4,4'-di-(cyclohexylamino)-diphenyl methane.

2. A polyolefin selected from the group consisting of polyethylene, polypropylene, polybutylene and mixed polymers of at least two olefins from the group of ethylene, propylene and butylene, said polyolefin containing a stabilizing agent consisting essentially of an antioxidizing concentration of 4,4'-di-(cyclohexylamino)-diphenyl propane.

3. Polyethylene containing an antioxidizing concentration of 4,4'-di-(cyclohexylamino)-diphenyl methane.

4. Polyethylene containing an antioxidizing concentration of 4,4'-di-(cyclohexylamino)-diphenyl propane.

5. Polypropylene containing an antioxidizing concentration of 4,4'-di-(cyclohexylamino)-diphenyl methane.

6. Polypropylene containing an antioxidizing concentration of 4,4'-di-(cyclohexylamino)-diphenyl propane.

References Cited by the Examiner
UNITED STATES PATENTS

| | | | |
|---|---|---|---|
| 1,954,377 | 4/34 | Calcott et al. | 260—45.9 |
| 2,452,319 | 10/48 | Patterson et al. | 252—56 |
| 2,985,617 | 5/61 | Sayler et al. | 260—45.9 |
| 3,011,976 | 12/61 | Cyba et al. | 260—570 |
| 3,060,121 | 10/62 | Orloff et al. | 252—48.2 |

OTHER REFERENCES

Goodsen et al.: Chem. Abstracts, vol. 43–3381h (1949).

LEON J. BERCOVITZ, Primary Examiner.

A. D. SULLIVAN, J. R. LIBERMAN, Examiners.